Patented Feb. 10, 1942

2,272,265

UNITED STATES PATENT OFFICE 2,272,265

METHOD OF MAKING SULPHUR-CONTAINING ORGANIC CONDENSATION PRODUCTS

Walter Frost, Gerhard Källner, and Otto Kölbl, Saarau, Kreis Schweidnitz, Germany, assignors to the firm Silesia, Verein Chemischer Fabriken, Saarau, Kreis Schweidnitz, Germany No Drawing. Application December 14, 1939, Serial No. 309,302. In Germany January 20, 1939

3 Claims. (Cl. 260—29)

The present invention relates to sulphur-containing, plastic, organic condensation products having an increased sulphur content, and a process for obtaining such condensation products. It has particular relation to organic polysulphides of high molecular weight obtained from water-soluble inorganic polysulphides and organic compounds having at least two replaceable, negative groups.

It is known that organic compounds which contain at least two replaceable, negative groups, such as dihalogenated hydrocarbons, or such ethers, esters, acetals, or aldehydes, react with polysulphides of alkali metals, ammonium or alkaline earths metals in the presence of dispersing agents, and, if desired, of protective colloid substances. By the reaction of these compounds, suspensions of sulphur-containing organic condensation products of high molecular weight are obtained, which, after being coagulated and treated on rolls, find various applications as rubber-like raw materials.

It is known that the properties of these condensation products are highly dependent upon their sulphur-content. By condensing a solution of sodium polysulphide of the formula $Na_2S_3$ with ethylene chloride, a condensation product is formed, the properties of which show a certain similarity to those of hard rubber. By using a solution of $Na_2S_4$ in the above reaction, a product similar to soft rubber is obtained. The use of an inorganic polysulphide still richer in sulphur, causes the formation of still softer products.

It has been proposed to use the aqueous suspensions of these condensation products, which are relatively rich in sulphur, as a coating or impregnating composition; it was assumed that these relatively soft products, like natural rubber latex, will dry to a coherent, soft, well-adhering and elastic coating. It has been found, however, that such suspensions of condensation products, which are particularly valuable because of their stability to organic solvents, tend to form, on drying, cracked layers and scaly coatings when applied as coating or impregnating compositions.

It has also been proposed to increase the sulphur content of the products, which have been precipitated from their suspensions, either by mixing them on rolls with sulphur and subjecting the mixture to a heat-treatment, or by dissolving the condensation products in molten sulphur with or without the addition of other ingredients. These processes must, however, be applied to the products after precipitation from their suspension, and cannot, therefore, be applied to suspensions, the use of which is particularly advantageous in many cases.

It was not possible hitherto to increase the sulphur content of the dispersed condensation products contained in the known suspensions to any desired amount. It is not possible to obtain polysulphide solutions which contain more sulphur than that corresponding to the formula $Na_2S_5$, and the other steps mentioned above for further increasing the sulphur content of the condensation products, cannot be applied to suspensions.

We have found that suspensions containing any desired amount of sulphur can easily be obtained by heating a suspension of the sulphur-containing organic condensation product together with very finely dispersed sulphur. We have found that during such heating the finely dispersed sulphur merges with the dispersed particles of the condensation product. This can be well recognized by examining the dispersion under a microscope. Prior to the heating step the irregular, angular sulphur particles can be clearly differentiated from the globular particles of the dispersed condensation product, whereas after a heating of several hours only globular particles can be seen. If a suspension of pure sulphur is heated, the particles remain unchanged even after several hours of heating.

The process of our present invention can be carried out with a suspension previously prepared and washed in the usual manner. The incorporation of sulphur with the particles of the condensation product, can, however, also be effected during the formation of such condensation product. This can be attained by dispersing very finely divided sulphur in an aqueous solution of an inorganic polysulphide, adding a dispersing agent, and, if desired, a protective colloid, and then mixing the organic compound used, with said polysulphide solution. An exceptionally finely dispersed suspension can thus be obtained which does not show the presence of free sulphur when examined under a microscope.

In carrying out our present invention, sulphur can be used as a dry powder or as a suspension of precipitated sulphur. Such a suspension of sulphur may be mixed and heated with the latex-like dispersion of the organic polysulphide or may be added to the solution of the inorganic polysulphide prior to its condensation with organic compounds. According to another modification of our invention, sulphur is precipitated from a polysulphide solution by the addition of a suitable amount of an acid, or a similarly acting precipitating agent, such as an acid salt, and the mixture of polysulphide solution and free sulphur thus obtained is condensed with an organic compound of the above mentioned class. The condensation product formed can preferably be heated to a higher temperature whereby a solidification takes place. The dispersions formed are washed, and can be used as coating or impregnating compositions or binders.

In comparison to dispersions which are prepared under similar conditions but without the incorporation of additional sulphur, the dispersions prepared according to our invention show the advantage of forming coherent coatings on drying. The known dispersions, such as those of condensation products obtained with inorganic polysulphides of the formula $MeS_{4.0}$ to about $MeS_{4.7}$ yield cracked layers or scales on drying. Thus, according to our invention, sulphur is used as an additional inexpensive reaction component which imparts valuable properties to the product formed. The water of the suspension obtained according to our invention can be sucked off and the residue can be dried or coagulated with acids and then treated on rolls. The resulting products can be used like polysulphide condensation products obtained without the incorporation of sulphur, for the production of soft rubber-like articles. Owing to their high adhesive properties they can also be employed, if desired in mixture with filling materials, as mastic, cement or the like.

*Example 1.*—A 50% aqueous suspension of an organic polysulphide condensation product is prepared in a known manner from sodium tetrasulphide and ethylene chloride in the presence of magnesium hydroxide. 2 kgms. of this suspension are thoroughly mixed with a suspension of 0.43 kgm. of very finely divided sulphur and 0.4 gm. of animal glue in 0.57 liter water. The mixture is heated under stirring to about 93° C. for 5 hours, and is then allowed to settle. By applying the suspension thus obtained to an article, a compact, rubber-like coating is formed on drying. A suspension obtained in a similar way but without the above-mentioned heating step or without the addition of sulphur, does not yield a coherent coating.

*Example 2.*—2 kgms. of a 50% aqueous suspension prepared as described in Example 1, are thoroughly mixed with the suspension 1 kgm. of very finely divided sulphur and 0.6 gm. animal glue in 1 liter water. The mixture is heated under stirring to about 95° C. for 6 hours. The suspension thus obtained can be spread on surfaces and forms a coherent, compact coating which is at first soft and rubber-like, but solidifies after a certain time and hardens to a tough, well-adhering film.

*Example 3.*—5.42 kgms. of very finely divided sulphur are introduced under stirring into 48 liters of a sodium tetrasulphide solution of a molarity of about 1.5. 270 grams of sodium hydroxide and 680 gms. of magnesium chloride are then added and 6.56 kgms. of ethylene chloride are introduced into the solution at 45–70° C. After termination of the reaction, the temperature is kept at about 80° C. for 2 hours. The reaction mixture is then diluted with water, and washed several times with water by decanting. A finely dispersed latex-like dispersion is obtained which can be used as a coating and impregnating composition.

*Example 4.*—200 cc. of a 1% solution of animal glue and 325 gms. of finely divided sulphur are thoroughly mixed under stirring with 3.2 liters of an aqueous sodium polysulphide solution of a molarity of about 1.7. The sodium polysulphide used has the formula $Na_2S_{4.6}$. To the mixture 20 gms. of sodium hydroxide and 48 gms. of magnesium chloride are added. 400 gms. of methylene chloride are then gradually introduced into the solution at 38° C. during 3 hours. Further treatment is carried out as described in Example 3.

*Example 5.*—3.2 liters of a sodium polysulphide solution of a molarity of about 1.7 are mixed with 100 cc. of a 1% solution of animal glue. The sodium polysulphide used has the formula $Na_2S_{4.6}$. A mixture of 163 cc. of concentrated hydrochloric acid and 423 cc. water are then introduced into the sodium polysulphide solution under stirring. To the solution 20 gms. of sodium hydroxide and 48 gms. of magnesium chloride are added, and the resulting solution is reacted with 306 gms. of ethylene chloride in a known manner. Further treatment is carried out as described in Example 3.

*Example 6.*—1.5 liters of a sodium tetrasulphide solution of a molarity of 1.5, are thoroughly mixed with 150 gms. of very finely divided sulphur. 7 gms. of sodium hydroxide and 18 gms. of magnesium chloride are then added, and the resulting solution is condensed in a known manner with 315 gms. of $\beta.\beta$-dichlordiethylether. The reaction mixture is further treated as described in Example 3. A suspension, which does not contain particles of free sulphur, is obtained.

The treatment with sulphur according to our present invention can be repeated or carried out in several steps. A certain amount of sulphur can, for example, be incorporated by adding sulphur to the inorganic polysulphide solution, and the suspension of the organic polysulphide thus obtained can be heated with a further amount of sulphur. Our process can also be carried out in the presence of fillers. The finely divided sulphur used in our invention, can be prepared and mixed with the dispersed organic polysulphide condensation product in any suitable manner.

In carrying out our invention, we prefer the use of about 5 to 80% free sulphur, calculated on 100 gms. of the dried end product. By using such amounts of free sulphur, an organic polysulphide condensation product containing 60 to 96% sulphur is obtained. We prefer the use of very finely divided sulphur, such as used for instance by the rubber industry.

We claim:

1. A process for producing an organic polysulphide plastic of high sulphur content, said process comprising heating an aqueous dispersion of an organic polysulphide plastic together with finely divided sulphur dispersed in said aqueous dispersion, said aqueous dispersion being obtained in the presence of a dispersing agent, by condensing an aqueous solution of a polysulphide selected from the group consisting of the polysulphides of alkali metals, alkaline-earth metals, and ammonium, with an organic compound containing two substituent atoms joined to carbon atoms, which substituents are split off during the reaction.

2. A process for producing an organic polysulphide plastic of high sulphur content, said process comprising dispersing finely divided sulphur in an aqueous solution of a polysulphide selected from the group consisting of the polysulphides of alkali metals, alkaline-earth metals, and ammonium, and condensing in the heat the dispersion obtained with an organic compound containing two substituent atoms joined to carbon atoms, which substituents are split off during the reaction which is carried out in the presence of a dispersing agent.

3. A process for producing an organic polysulphide plastic of high sulphur content, said process comprising preparing a dispersion of finely divided sulphur in an aqueous solution of a polysulphide by the precipitation of a portion of the polysulphide sulphur from the aqueous solution of a polysulphide selected from the group consisting of the polysulphides of alkali metals, alkaline-earth metals, and ammonium, and condensing in the heat said dispersion of finely divided sulphur in said aqueous solution with an organic compound containing two substituent atoms joined to carbon atoms, which substituents are split off during the reaction which is carried out in the presence of a dispersing agent.

WALTER FROST.
GERHARD KÄLLNER.
OTTO KÖLBL.